United States Patent
Rao et al.

(10) Patent No.: US 11,249,808 B2
(45) Date of Patent: Feb. 15, 2022

(54) CONNECTING ACCELERATOR RESOURCES USING A SWITCH

(71) Applicant: Intel Corporation, Santa Clara, CA (US)

(72) Inventors: Anil Rao, Menlo Park, CA (US); Debendra Das Sharma, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 915 days.

(21) Appl. No.: 15/682,896

(22) Filed: Aug. 22, 2017

(65) Prior Publication Data

US 2019/0065272 A1    Feb. 28, 2019

(51) Int. Cl.
    *G06F 9/50*      (2006.01)
    *G06F 9/4401*    (2018.01)
    *G06F 9/48*      (2006.01)
    *H04L 67/10*     (2022.01)

(52) U.S. Cl.
    CPC .......... *G06F 9/5044* (2013.01); *G06F 9/4411* (2013.01); *G06F 9/4413* (2013.01); *G06F 9/4843* (2013.01); *H04L 67/10* (2013.01)

(58) Field of Classification Search
    None
    See application file for complete search history.

(56) References Cited

U.S. PATENT DOCUMENTS

| | | |
|---|---|---|
| 4,769,777 A | 9/1988 | Bittle et al. |
| 4,945,548 A | 7/1990 | Iannarone et al. |
| 6,917,999 B2 * | 7/2005 | Kumar ............... G06F 9/4411 710/300 |
| 7,474,612 B1 | 1/2009 | Patel |
| 8,041,853 B2 | 10/2011 | Castellano et al. |
| 8,467,218 B1 | 6/2013 | Atsatt et al. |
| 8,767,756 B2 | 7/2014 | Black et al. |
| 9,104,818 B2 * | 8/2015 | Miyoshi ............... G06F 13/40 |

(Continued)

FOREIGN PATENT DOCUMENTS

| | | |
|---|---|---|
| WO | 2012170829 | 12/2012 |
| WO | 2016039791 | 3/2016 |

OTHER PUBLICATIONS

Pezzarossa et al. "Reconfiguration in FPGA-Based Multi-Core Platforms for Hard Real-Time Applications", 2016 IEEE, 8 pages.*

(Continued)

*Primary Examiner* — Van H Nguyen
(74) *Attorney, Agent, or Firm* — Essential Patents Group, LLP.; Christopher K. Gagne

(57) ABSTRACT

The present disclosure describes a number of embodiments related to devices and techniques for implementing an interconnect switch to provide a switchable low-latency bypass between node resources such as CPUs and accelerator resources for caching. A resource manager may be used to receive an indication of a node of a plurality of nodes and an indication of an accelerator resource of a plurality of accelerator resources to connect to the node. If the indicated accelerator resource is connected to another node of the plurality of nodes, then transmit, to a interconnect switch, one or more hot-remove commands. The resource manager may then transmit to the interconnect switch one or more hot-add commands to connect the node resource and the accelerator resource.

23 Claims, 6 Drawing Sheets

(56) References Cited

U.S. PATENT DOCUMENTS

| | | | |
|---|---|---|---|
| 9,460,042 B2 * | 10/2016 | Iskandar | G06F 13/4031 |
| 9,626,321 B2 * | 4/2017 | Safranek | G06F 12/0831 |
| 9,673,963 B1 | 6/2017 | Ribo | |
| 9,798,556 B2 * | 10/2017 | Ayyar | G06F 13/24 |
| 9,934,187 B2 * | 4/2018 | Shih | G06F 13/385 |
| 10,097,620 B2 * | 10/2018 | Reddy | H04L 43/065 |
| 10,162,786 B2 * | 12/2018 | Shin | G06F 13/4081 |
| 10,191,877 B2 * | 1/2019 | Harriman | G06F 13/36 |
| 10,467,052 B2 * | 11/2019 | Chen | H04L 67/1097 |
| 10,757,487 B2 * | 8/2020 | Kumar | H04L 43/0876 |
| 2003/0005200 A1 * | 1/2003 | Kumar | G06F 9/5077 710/302 |
| 2004/0202148 A1 | 10/2004 | Kuehnel | |
| 2005/0018760 A1 | 1/2005 | Smith et al. | |
| 2005/0060469 A1 | 3/2005 | Feng et al. | |
| 2005/0086336 A1 | 4/2005 | Haber | |
| 2009/0074408 A1 | 3/2009 | Black et al. | |
| 2009/0267643 A1 | 10/2009 | Lewis et al. | |
| 2010/0060310 A1 | 3/2010 | Laisne et al. | |
| 2010/0315135 A1 | 12/2010 | Lai et al. | |
| 2011/0134705 A1 | 6/2011 | Jones et al. | |
| 2011/0179212 A1 | 7/2011 | Hartman | |
| 2013/0007414 A1 | 1/2013 | Sharma | |
| 2013/0007489 A1 | 1/2013 | Unnikrishnan et al. | |
| 2013/0054849 A1 | 2/2013 | Loh et al. | |
| 2013/0163605 A1 | 6/2013 | Chandra et al. | |
| 2013/0205053 A1 | 8/2013 | Harriman et al. | |
| 2013/0246679 A1 * | 9/2013 | Miyoshi | G06F 1/185 710/300 |
| 2014/0098617 A1 | 4/2014 | Jones et al. | |
| 2014/0122560 A1 | 5/2014 | Ramey et al. | |
| 2014/0372663 A1 | 12/2014 | Chandra et al. | |
| 2015/0032917 A1 | 1/2015 | Nguyen | |
| 2015/0039787 A1 | 2/2015 | Voorhees et al. | |
| 2015/0067206 A1 | 3/2015 | Luo et al. | |
| 2015/0121115 A1 | 4/2015 | Chandra et al. | |
| 2015/0172090 A1 | 6/2015 | Sawyer | |
| 2015/0261718 A1 | 9/2015 | Campbell et al. | |
| 2015/0363350 A1 | 12/2015 | Yeung et al. | |
| 2015/0370736 A1 | 12/2015 | Brown et al. | |
| 2016/0028537 A1 | 1/2016 | Erdogan et al. | |
| 2016/0147606 A1 | 5/2016 | Arroyo et al. | |
| 2016/0147681 A1 | 5/2016 | Arroyo et al. | |
| 2016/0147697 A1 | 5/2016 | Arroyo et al. | |
| 2016/0147705 A1 | 5/2016 | Arroyo et al. | |
| 2016/0156544 A1 | 6/2016 | Holm et al. | |
| 2016/0179738 A1 | 6/2016 | Guddeti et al. | |
| 2016/0182186 A1 | 6/2016 | Adler et al. | |
| 2016/0191313 A1 | 6/2016 | Chen et al. | |
| 2016/0377679 A1 | 12/2016 | Froelich et al. | |
| 2017/0017604 A1 | 1/2017 | Chen | |
| 2017/0019247 A1 | 1/2017 | Iyer et al. | |
| 2017/0031863 A1 | 2/2017 | Glaser | |
| 2017/0039162 A1 | 2/2017 | Mishra | |
| 2017/0116090 A1 | 4/2017 | Arroyo et al. | |
| 2017/0257273 A1 | 9/2017 | Li et al. | |
| 2017/0286359 A1 | 10/2017 | McGowan | |
| 2018/0227149 A1 | 8/2018 | Johnson | |
| 2018/0314550 A1 * | 11/2018 | Chen | G06F 9/4881 |
| 2019/0007310 A1 | 1/2019 | Das Sharma et al. | |
| 2019/0028262 A1 | 1/2019 | Kobayashi et al. | |

OTHER PUBLICATIONS

Tsuruta et al. "Accelerator-in-Switch: a framework for tightly coupled switching hub and an accelerator with FPGA", 2017 IEEE, 4 pages.*

Hanawa et al. "Interconnection Network for Tightly Coupled Accelerators Architecture", 2013 IEEE, pp. 79-82.*

Prabhakaran et al. "A Dynamic Resource Management System for Network-Attached Accelerator Clusters", 2013 IEEE, pp. 773-782.*

Rinke et al. "A Dynamic Accelerator-Cluster Architecture", 2012 IEEE, pp. 357-366.*

Jen et al., "Low Latency Retimer", U.S. Appl. No. 15/387,802, filed Dec. 22, 2016, 70 pages.

Das Sharma et al., "Techniques to Support Multiple Protocols Between Computer System Interconnects", U.S. Appl. No. 15/639,393, filed Jun. 30, 2017, 63 pages.

Das Sharma et al., "Adjustable Retimer Buffer", U.S. Appl. No. 15/476,571, filed Mar. 31, 2017, 73 pages.

International Preliminary Reporton Patentability for International Patent Application No. PCT/US2017/062452, dated Jun. 25, 2019.

International Preliminary Reporton Patentability for International Patent Application No. PCT/US2018/019896, dated Oct. 1, 2019.

International Preliminary Reporton Patentability for International Patent Application No. PCT/US2018/035034, dated Dec. 31, 2019.

International Search Report and Written Opinion for International Patent Application No. PCT/US2017/062452, dated Mar. 13, 2018, 8 pages.

International Search Report and Written Opinion for International Patent Application No. PCT/US2018/019896, dated Jun. 12, 2018, 9 pages.

International Search Report and Written Opinion for International Patent Application No. PCT/US2018/035034, dated May 30, 2018, 11 pages.

Notice of Allowance for U.S. Appl. No. 15/387,802, dated Mar. 25, 2020.

Notice of Allowance for U.S. Appl. No. 15/476,571, dated Aug. 5, 2020.

Notice of Allowance for U.S. Appl. No. 15/639,393, dated Apr. 12, 2021.

Office Action for U.S. Appl. No. 15/387,802, dated Jan. 8, 2019.
Office Action for U.S. Appl. No. 15/387,802, dated Nov. 29, 2019.
Office Action for U.S. Appl. No. 15/476,571, dated Apr. 16, 2020.
Office Action for U.S. Appl. No. 15/639,393, dated Feb. 5, 2021.
Office Action for U.S. Appl. No. 15/639,393, dated Sep. 1, 2020.
Office Action for U.S. Appl. No. 15/387,802, dated Apr. 18, 2018.

* cited by examiner

600

Non-transitory computer-readable storage media 602,
as may be implemented in embodiments of FIG. 3.

Programming instructions 604
to cause a digital content consumption device, in response to execution of the instructions
by a processor of the digital content consumption device, to practice aspects of embodiments
of the processes of FIG. 4.

FIG. 6

CONNECTING ACCELERATOR RESOURCES USING A SWITCH

FIELD

Embodiments of the present disclosure generally relate to the field of computing systems. More specifically, embodiments relate to devices and methods for switching one or more node resources, which may include central processing units (CPUs) with one or more accelerator resources.

BACKGROUND

Over the last several years, workload demands within data centers have greatly increased. In response, data centers have become larger; have included additional data center racks with various resources that may be interconnected with each other in various ways to meet both increasing and fluctuating workload demands.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 6 is a diagram illustrating computer readable media having instructions for practicing managing connections between node resources and accelerator resources using an interconnect switch, in accordance with various embodiments.

DETAILED DESCRIPTION

Figure 1:
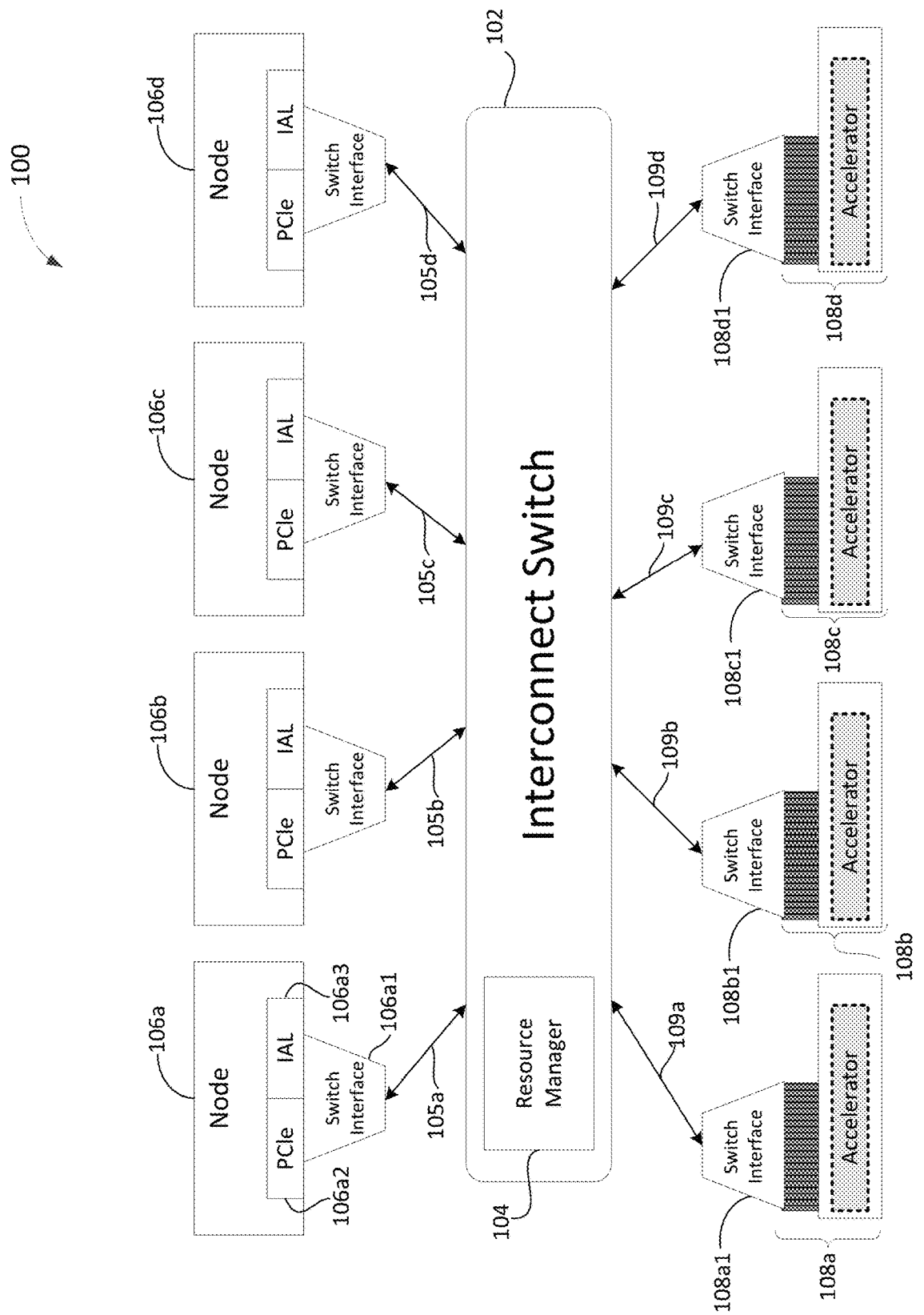
FIG. 1 is a diagram of an example implementation of an interconnect switch to connect node resources with accelerator resources, in accordance with various embodiments.

Methods, apparatuses, and systems that may allow accelerator resources to be shared with node resources that may be located within a rack or a pod by using a low-latency switch may be disclosed herein. In embodiments, each accelerator resource may be coupled with one node resource at a given time. In embodiments, an accelerator resource may be a Field Programmable Gate Array (FPGA), Graphical Processing Unit (GPU), an Application Specific Integrated Circuit (ASIC), Input/Output (I/O) accelerator, or other resource. In embodiments, an accelerator resource may implement a memory or other cache. In embodiments, a node resource may be a CPU.

Data center operations that include multiple data center racks may benefit from the flexibility to add, remove, or move connections of accelerator resources from one node resource to another node resource within a data center rack or a pod without physical intervention from an operator. In embodiments, accelerator resources, when connected with a node resource, may involve coherency and memory extensions. I/O accelerators may have load-store semantics.

Coherency extensions allow the accelerators to cache the system memory hosted by the node, enabling higher performance at a lower power. Memory extensions enable a node resource to access the memory hosted by the accelerator, in a way similar to system memory, thereby enabling better sharing between the node and the accelerator for better performance. Load-store semantics may allow a CPU or device to access memory-mapped resources directly as a load command (e.g., read) or as a store command (e.g., write).

In legacy implementations, it is challenging to share an accelerator resource among multiple node resources when the node resources may belong to different coherency domains. This may be due to tight coupling of resources in a coherency domain and fault isolation requirements across domains. Disadvantages of these legacy approaches may include limiting certain computing tasks to specific node resources that may have existing required functionality (i.e. existing coupled accelerator resources). Other disadvantages may include a data center that may be overprovisioned with resources to prepare for a worst-case computing scenario task or other operational requirement. This may result in an excess of deployed accelerator resources and resulting underutilization of the accelerator resources in a data center.

These and other challenges may be overcome by allowing accelerator resources and node resources to be connected using one or more interconnect switches to create a switchable path from a node resource to an accelerator resource. In embodiments, reconfiguring the switchable path may include hot-removing an accelerator resource from a connected node resource and then hot-adding the accelerator resource to the new node resource, using the interconnect switch and a resource manager. In embodiments, the connection between the node resources and accelerator resources may be changed via one or more software commands to the interconnect switch. In embodiments, no physical devices (e.g. accelerator resources) need to be physically moved.

In the following description, various aspects of the illustrative implementations are described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. However, it will be apparent to one skilled in the art that embodiments of the present disclosure may be practiced without the specific details. In other instances, well-known features are omitted or simplified in order not to obscure the illustrative implementations.

In the following description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "including," "having," and the like, as used with respect to embodiments of the present disclosure, are synonymous.

The terms "coupled with" and "coupled to" and the like may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. By way of example and not limitation, "coupled" may mean two or more elements or devices are coupled by electrical connections on a printed circuit board such as a motherboard, for example. By way of example and not limitation, "coupled" may mean two or more elements/devices cooperate and/or interact through one or more network linkages such as wired and/or wireless networks. By way of example and not limitation, a computing apparatus may include two or more computing devices "coupled" on a motherboard or by one or more network linkages.

Various operations are described as multiple discrete operations in turn, in a manner that is most helpful in understanding the claimed subject matter. However, the order of description should not be construed as to imply that these operations are necessarily order dependent.

FIG. 1 is a diagram of an example implementation of a switch to connect node resources with accelerator resources, in accordance with various embodiments. Diagram 100 shows an interconnect switch 102 that may be managed by a resource manager 104. In embodiments, the resource manager 104 may be a part of the interconnect switch 102. In embodiments, the resource manager 104 may be external to but coupled with the interconnect switch 102. The interconnect switch 102 may use a FlexBus™ interconnect protocol or other protocol to support data on a Peripheral Component Interconnect Express (PCIe) bus or other bus.

One or more node resources 106a-106d may be coupled with the interconnect switch 102 or coupled with the resource manager 104. A node resource may be a CPU. A node resource may also be multiple CPUs connected using coherency links. In embodiments, one or more accelerator resources 108a-108d may be connected to the interconnect switch 102. In embodiments, accelerators may include FPGAs, GPUs, ASICs, I/O accelerators, or other resources. In embodiments, accelerator resources 108a-108d may be used as a cache for a node resource 106a-106d. Links 105a-105d may respectively connect node resources 106a-106d to the interconnect switch 102 and links 109a-109d may respectively connect accelerator resources 108a-108d to the interconnect switch 102.

In configurations, a node resource 106a-106d and accelerator resource 108a-108d may be connected to a plurality (not shown) of interconnect switches 102 that may be jointly managed by the resource manager 104. In embodiments, each of the plurality of interconnect switches 102 may be bit-sliced or hierarchical to allow for a higher radix switching across the higher number of nodes and accelerators.

A bit-sliced switch implementation may be realized by having multiple physical interconnect switches 102 each dealing with a different sub-set of lanes of the PCIe bus or other bus. For example, if each of the links 105a-105d, 109a-109d have 16 lanes, a switch with 8 links (radix=8), as shown in diagram 100 will need to be able to handle 128 lanes. If we need to extend that to 64 Links (radix=64) and a physical switch can only handle 128 Lanes, we can have 8 of these physical interconnect switches 102 forming one logical switch handling the connectivity across the 64 Links. For example, a first physical interconnect switch 102 may handle lanes 0 and 1 of each of the links 105a-105d, 109a-109d, the second physical interconnect switch (not shown) handles lanes 2 and 3 of each of the links 105a-105d, 109a-109d, and so on. This may build a higher radix switch (the one that handles 64 links rather than 8 links) while not extending the distance between the node and the accelerator.

Another approach for extending the switching radix is by using hierarchical switching (not shown) where different node resources 106a-106d may connect to different interconnect switches and the interconnect switches are connected through another layer of interconnect switches. In embodiments, a combination of bit-sliced and hierarchical switching may be used to extend the switching radix. These approaches may be used to provide connectivity between nodes and resources (such as accelerators) in a pod, which is a collection of racks. A rack is a physical enclosure where multiple nodes and accelerators may be hosted.

Turning back to diagram 100, resource manager 104 may determine that one of the node resources 106a-106d is to be connected with one of the accelerators resources 108a-108d. The resource manager 104 may receive requests from various nodes 106a-106d needing resources and may respond to the requests by allocating an accelerator resource from the resources 108a-108d to the requesting node. These requests and responses may be sent using standard manageability or networking resources (not shown) that support communication between a node resource 106a-106d and the resource manager 104.

For example, the resource manager 104 may receive a request to configure the interconnect switch 102 to directly connect a node resource 106a with an accelerator resource 108c. This configuration may be done entirely through software, for example by sending a command to one or more multiplexers such as multiplexers 207a1-207h1 of FIG. 2 (described below) within the interconnect switch 102.

Continuing the example, the resource manager 104 may determine that accelerator resource 108c may be already connected to another node resource 106d. The resource manager 104 may cause a disconnect, or a hot-remove, of the previously connected accelerator resource 108c from the node resource 106d. In embodiments, before the accelerator resource 108c may be hot-removed, system software that may be running in the node resource 106d and the accelerator resource 108c may quiesce data traffic between the accelerator resource 108c and the node resource 106d using mechanisms available within each of the resources. These mechanisms may include flushing caches of memory belonging to the other resource, ensuring all traffic between the accelerator resource 108c and node resource 106d is completed, and the like. Once the data traffic is quiesced, the system software may communicate with the resource manager 104 to initiate the hot-remove of accelerator resource 108*c* and from node 106*d*, which may involve disconnecting the connection between the corresponding link 109*c* and link 106*d* using the interconnect switch 102. Subsequently, the resource manager 104 may establish a connection between the links 105*a*, 109*c* between node resource 106*a* and accelerator resource 108*c* using the interconnect switch 102.

After the node resource 106*a* and the accelerator resource 108*c* are connected, configuration information may be exchanged between the node resource 106*a* and the accelerator resource 108*c*. The node resource 106*a*-106*d* may communicate with the interconnect switch 102 using a switch interface 106*a*1-106*d*1. In embodiments the node resource 106*a*-106*d* may communicate with the switch interface 106*a*1-106*d*1 using a PCIe port 106*a*2-106*d*2, an Intel Accelerator Link (IAL) port 106*a*3-106*d*3, or some other port (not shown).

Once the node resource 106*a* and accelerator resource 108*c* are connected, the switch interface 106*a*1 may perform link training with the accelerator resource 108*c* to coordinate and establish the connection to behave in a consistent manner. This link training may be accomplished using a Training Status State Machine (LTSSM).

After link training, a hot-add flow may begin in the node resource 106*a* with notification orchestrated by the resource manager 104. During the hot-add flow, the system software running in the host may discover the newly-added accelerator resource 108*c* and may perform initialization and/or mapping so that the node resource 106*a* can start using the accelerator resource 108*c*. Once the connection through the interconnect switch 102 is established, the increased latency in communication between the node resource 106*a* and accelerator resource 108*c* may be less than 10 nanoseconds (ns).

Figure 2:
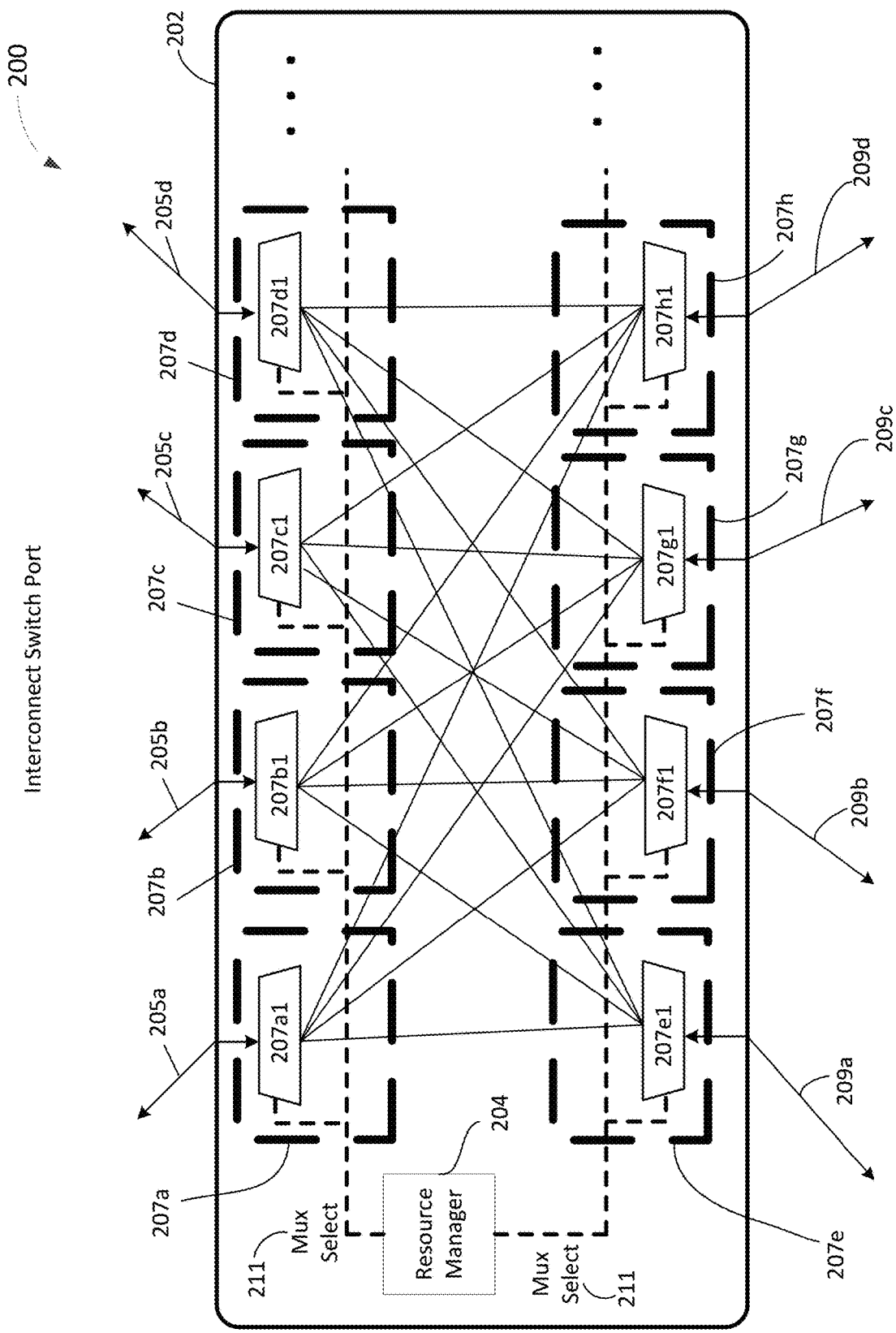
FIG. 2 is a diagram of an example interconnect switch including interconnect switch ports, in accordance with various embodiments.

FIG. 2 is a diagram of an example interconnect switch including interconnect switch ports, in accordance with various embodiments. Diagram 200 may show an interconnect switch 202, which may be similar to the interconnect switch 102 of FIG. 1. Links 205*a*-205*d* may be similar to links 105*a*-105*d*, and links 209*a*-209*d* may be similar to links 109*a*-109*d*. Links 205*a*-205*d*, 209*a*-209*d* may each connected, respectively, through connections between interconnect switch ports 207*a*-207*h*. The connections may be managed by resource manager 204, which may be similar to resource manager 104 of FIG. 1.

Figure 3:
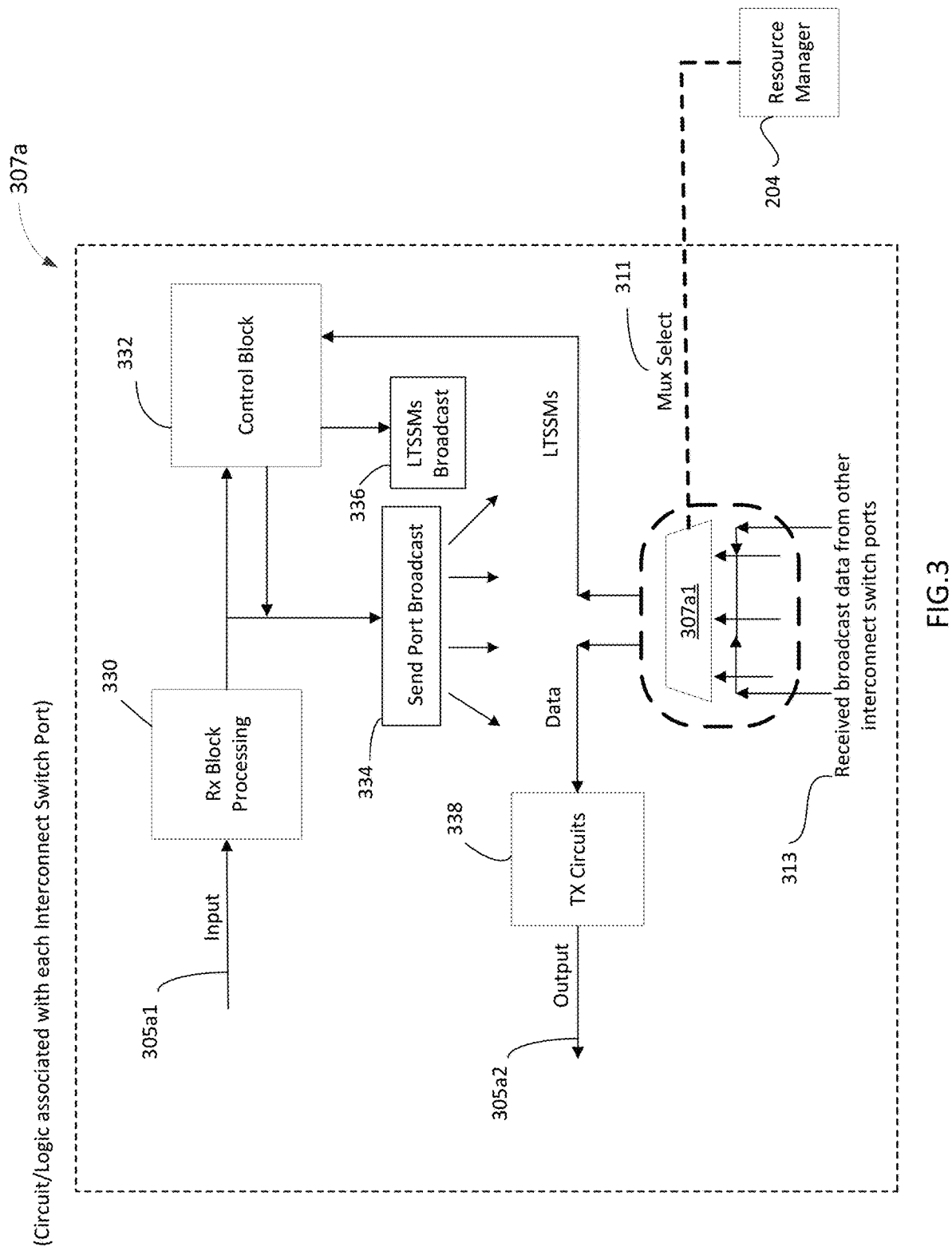
FIG. 3 is a diagram of an example implementation of an interconnect switch port, in accordance with various embodiments.

Each of the interconnect switch ports 207*a*-207*h*, which are described in further detail in FIG. 3, respectively include a mux 207*a*1-207*h*1. Each mux 207*a*1-207*h*1 may receive mux select information 211 from the resource manager 204 to indicate which one of a first set of muxes 207*a*1-207*d*1 is to be connected to a one of a second set of muxes 207*e*1-207*h*1 in order to establish a low-latency bypass path between one of links 205*a*-205*d* and one of links 209*a*-209*d*. In embodiments, muxes 207*a*1-207*d*1 in interconnect switch ports 207*a*1-207*d*1 associated with node resources 106*a*-106*d* may be connected with any other muxes 207*e*1-207*h*1 in interconnect switch ports 207*e*1-207*h*1 associated with accelerator resources 108*a*-108*d*, and vice-versa.

In embodiments, the interconnect switch 202 may be similar to a low latency retimer. The resulting low-latency bypass paths may provide a dramatic increase in speed between a connected node resource 106*a*-106*d* and a connected accelerator resource 108*a*-108*d*. Legacy implementations that connect a node resource and an accelerator resource using software paths or full hardware stacks to facilitate communication will encounter significant latency as the data packets traverse through the protocol stacks. Unlike legacy implementations, the interconnect switch 102 may have very low performance overhead by establishing a direct wired connection allowing for high communication speeds to support communication between a CPU and a I/O device, a cache, a GPU, or some other accelerator device.

FIG. 3 is a diagram of an example implementation of an interconnect switch port, in accordance with various embodiments. Diagram 307*a* shows details of an example interconnect switch port which may be similar to interconnect switch port 207*a* of FIG. 2. Diagram 307*a* may represent any interconnect switch port 207*a*-207*h*. Input may be received through link 305*a*1, and output may be sent through link 305*a*2. Links 305*a*1, 305*a*2 may be the same physical wire or bus, and may be similar to link 205*a* that may couple the interconnect switch port 307*a* with a switch interface 106*a*1 of a node resource 106*a*. Link 305*a*1 may include data received from a node resource over link 205*a*, and link 305*a*2 may include data to be sent to a node resource over link 205*a*. In other embodiments where the interconnect switch port is connected to an accelerator resource port such as resource port 209*a*, then link 305*a*1 may indicate data received from accelerator resource 108*a* over link 209*a*, and link 305*a*2 may indicate data to be sent to accelerator resource 108*a* over link 209*a*.

Receive (Rx) block processing 330 may receive data over link 305*a* and convert the data for use within the interconnect switch port 307*a*. For example, Rx block processing 330 may include converting the received data from a serial to a parallel format and performing data alignment, decoding, descrambling, and/or buffering. Additional functions may also be performed. Data from Rx Block Processing 330 may be used by the Control Block 332 to perform functions related to LTSSM link training as discussed above in addition to other functionality such as monitoring traffic and switching.

Data resulting from Rx Block Processing 330 as well as data resulting from the Control Block 332 may be combined. The Port Broadcast 334 function may take this combined data and broadcast it to all other interconnect switch ports 207*a*-207*h*. For example, if the interconnect switch port 307*a* is associated with a node resource 106*a*-106*d*, then Port Broadcast 334 may broadcast a copy of the data to the input of all muxes 207*e*1-207*h*1 associated respectively with interconnect switch ports 207*e*-207*h* of accelerator resources 108*a*-108*d*. If the interconnect switch port 307*a* is associated with an accelerator resource 108*a*-108*d*, then Port Broadcast 334 may broadcast a copy of the data to the input of all muxes 207*a*1-207*d*1 associated respectively with interconnect switch ports 207*a*-207*d* of node resources 106*a*-106*d*. Similarly, control block information from Control Block 332, which may include LTSSM information, may be broadcast to other LTSSMs using LTSSM Broadcast 336.

The mux 307*a*1, which may be similar to muxes 207*a*1-207*h*1 of FIG. 2, may receive data broadcast from all of or a plurality of other interconnect switch ports 207*a*-207*h*. For example, if the mux 307*a*1 is associated with a node resource 106*a*-106*d*, then the mux 307*a*1 may receive data from each of the interconnect switch ports 207*e*-207*h* associated respectively with accelerator resources 108*a*-108*d*. If the mux 207*a*1 is associated with an accelerator resource 108*a*-108*d*, then the mux 307*a*1 may receive data from each of the interconnect switch ports 207*a*-207*d* associated respectively with node resources 106*a*-106*d*.

Mux select information 311, which may be similar to mux select information 211 of FIG. 2, is provided by the resource manager 204, which may be outside of interconnect switch port 307a. Mux select information 311 may indicate to the mux 307a which of the Received broadcast data from other interconnect switch ports 313 from the other interconnect switch ports 207a-207d, or 207e-207h that the mux 307a should receive data from.

The received data may then be processed by Transmit (Tx) Circuits 338 and sent as output data 305a2 back to either the node resource 106a-106d or the accelerator resource 108a-108d to which the interconnect switch port 307a is associated. In addition, the received data that may be associated with LTSSM communications may be received by the Control Block 332. The Tx circuits 338 may perform the parallel to serial conversion of data along with applying the appropriate Tx Equalization values agreed to during initial link training.

Figure 4:
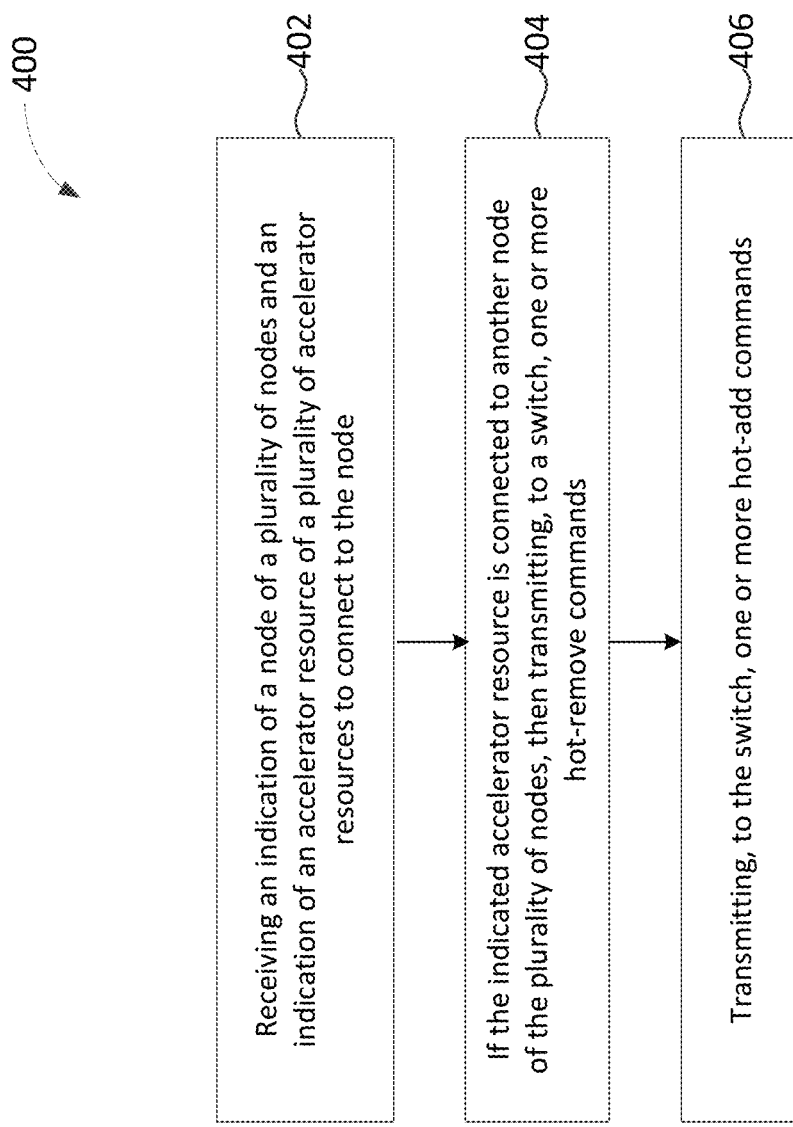
FIG. 4 is a block diagram that illustrates a process for implementing managing connections between node resources and accelerator resources using an interconnect switch, in accordance with various embodiments.

FIG. 4 is a block diagram that illustrates a process for implementing managing connections between node resources and accelerator resources using an interconnect switch, in accordance with various embodiments. In embodiments, the resource manager 104, the interconnect switch 102, node resources 106a-106d, switch interfaces 106a1-106d1, 108a1-108d1, and accelerator resources 108a-108d of FIG. 1 may perform a portion of, or may perform one or more processes such as the process 400.

At block 402, the process may include receiving an indication of a node resource of a plurality of node resources and an indication of an accelerator resource of a plurality of accelerator resources to connect to a node resource. The resource manager 104 may maintain a directory of node resources 106a-106d and accelerator resources 108a-108d and a list of which accelerator resources are currently connected to which node resources.

A node resource 106a-106d may send a request to the resource manager 104 to connect to an available accelerator resource or to a specific accelerator resource, depending on requirements of the node resource. A node resource 106a-106d may be a CPU or may be multiple CPUs connected using coherency links. In embodiments, node resources 106a-106d may belong in different coherency domains, and may be located in different racks or pods. In embodiments, the resource manager 104 may run on a single computer, or may be decentralized across multiple computers, depending on the configuration of the one or more interconnect switches 102.

At block 404, the process may include, if the indicated accelerator resource is connected to another node of the plurality of nodes, transmitting, to a circuit switch, one or more hot-remove commands. In embodiments, the resource manager 104 may check its directory to determine if the indicated accelerator resource is connected to another node. If the requested accelerator resource is already connected, then the resource manager 104 may transmit a hot-remove command to the interconnect switch 102. In embodiments, the hot-remove command may be a sequence of instructions to disconnect the connection between another node resource and the indicated accelerator resource. Prior to disconnecting the connection, the data traffic between the indicated accelerator resource and the other node resource may be quiesced as described above. In embodiments, the one or more commands may be to one or more interconnect switch ports 207a-207h and to respective muxes 207a1-207h1 to stop receiving broadcast data from other interconnect switch ports.

At block 406, the process may include transmitting to the switch one or more hot-add commands. In embodiments, the one or more hot-add commands may be to connect the indicated node with the indicated accelerator resource. This may include sending one or more commands to one or more interconnect switch ports 207a-207h, as described above, within the interconnect switch 102, to connect the indicated node resource and the indicated accelerator resource. This may include the resource manager 204 sending mux select 211 commands to individual muxes 207a1-207h1 to indicate to the individual muxes from which interconnect switch port 207a-207h the mux should start receiving data.

In embodiments, once the indicated node resource and the indicated accelerator resource are connected, the connection may be configured to enable data to be communicated over the connection. In embodiments, this may be referred to as link training and the subsequent hot-add flow. In embodiments, this may be done through LTSSM as described above so that bits can be physically exchanged between a node resource 106a-106d and the connected accelerator resource 108a-108d.

Figure 5:
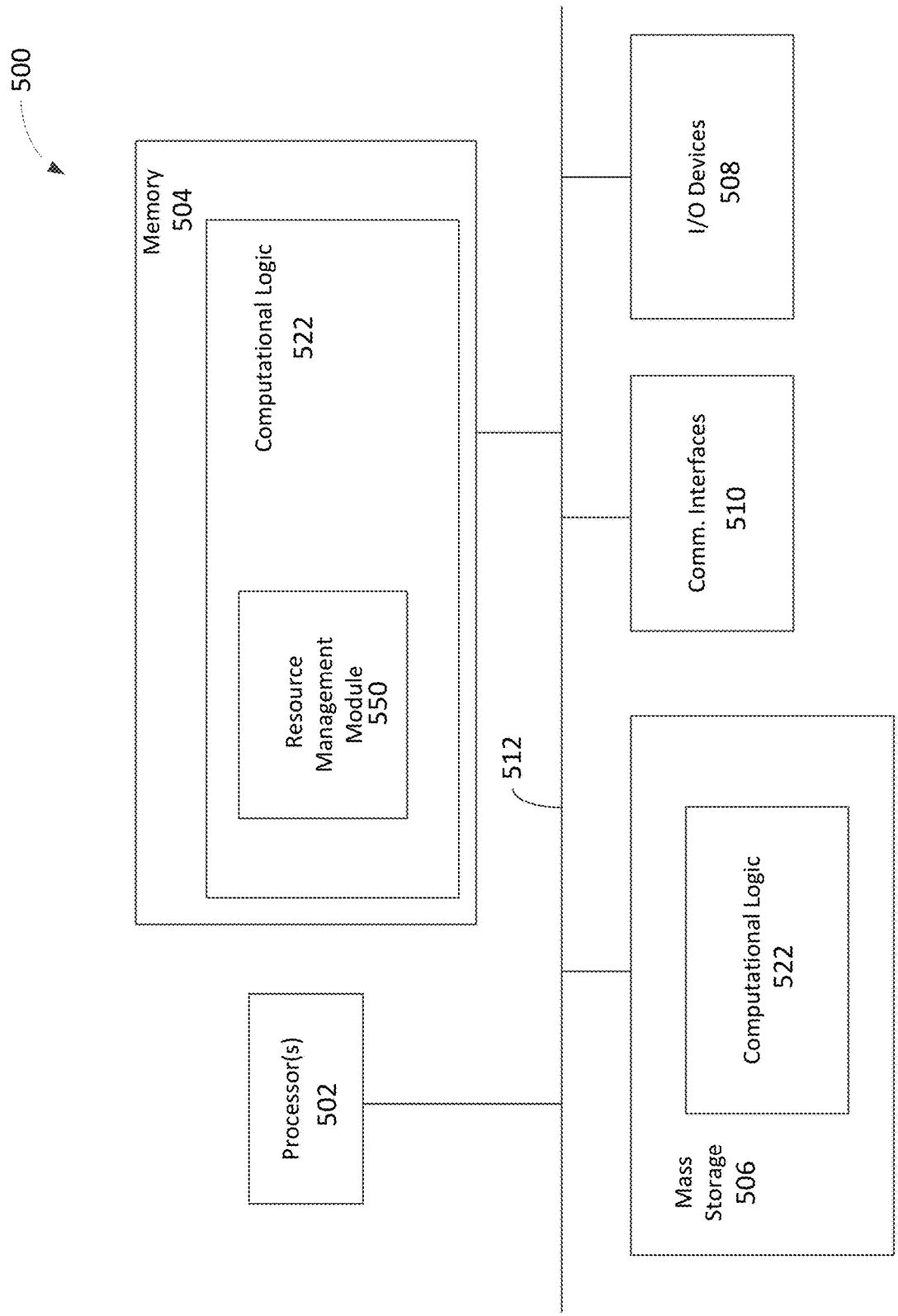
FIG. 5. illustrates an example computing device suitable for use to practice aspects of the present disclosure, in accordance with various embodiments.

FIG. 5 illustrates an example computing device suitable for use to practice aspects of the present disclosure, in accordance with various embodiments. The example computing device of diagram 500 may be suitable to practice the functions associated with diagrams 100, 200, 300, and 400. In embodiments, diagram 500 may be used to implement one or more resource managers 104.

As shown, computing device 500 may include one or more processors 502, each having one or more processor cores, and system memory 504. The processor 502 may include any type of unicore or multi-core processors. Each processor core may include a central processing unit (CPU), and one or more level of caches. The processor 502 may be implemented as an integrated circuit. The computing device 500 may include mass storage devices 506 (such as diskette, hard drive, volatile memory (e.g., dynamic random access memory (DRAM)), compact disc read only memory (CD-ROM), digital versatile disk (DVD) and so forth). In general, system memory 504 and/or mass storage devices 506 may be temporal and/or persistent storage of any type, including, but not limited to, volatile and non-volatile memory, optical, magnetic, and/or solid state mass storage, and so forth. Volatile memory may include, but not be limited to, static and/or dynamic random access memory. Non-volatile memory may include, but not be limited to, electrically erasable programmable read only memory, phase change memory, resistive memory, and so forth.

The computing device 500 may further include input/output (I/O) devices 508 such as a display, keyboard, cursor control, remote control, gaming controller, image capture device, and communication interfaces 510 (such as network interface cards, modems, infrared receivers, transceivers, radio receivers (e.g., Bluetooth), and so forth). I/O devices 508 may be suitable for communicative connections with an interconnect switch 102 of FIG. 1, a plurality of interconnect switches (not shown), or some other device necessary for implementing the functionalities coupling a node resource to an accelerator resource with reference to FIGS. 1-4.

In embodiments, communication interfaces 510 may include communication chips (not shown) that may be configured to operate the device 500 in accordance with wired or with wireless protocols.

The above-described computing device 500 elements may be coupled to each other via system bus 512, which may represent one or more buses. In the case of multiple buses, they may be bridged by one or more bus bridges (not shown). Each of these elements may perform its conventional functions known in the art. In particular, system memory 504 and mass storage devices 506 may be employed to store a working copy and a permanent copy of the programming instructions implementing the operations and functionalities associated with the resource manager 104, generally shown as computational logic 522. Computational logic 522 may be implemented by assembler instructions supported by processor(s) 502 or high-level languages that may be compiled into such instructions.

In embodiments, the Computational Logic 522 may contain a resource manager module 350, which may perform one or more of the functions associated with diagrams 100, 200, 300, and 400.

The permanent copy of the programming instructions may be placed into mass storage devices 506 in the factory, or in the field, though, for example, a distribution medium (not shown), such as a compact disc (CD), or through communication interfaces 310 (from a distribution server (not shown)).

FIG. 6 is a diagram illustrating computer readable media having instructions for practicing managing connections between node resources and accelerator resources using an interconnect switch, in accordance with various embodiments. Diagram 600 may illustrate computer readable media 602 having instructions for practicing the above-described techniques, or for programming/causing systems and devices to perform the above-described techniques, in accordance with various embodiments. In some embodiments, such computer readable media 602 may be included in a memory or storage device, which may be transitory or non-transitory, of the computing device 500 of FIG. 5. In embodiments, instructions 604 may include assembler instructions supported by a processing device, or may include instructions in a high-level language, such as C, that can be compiled into object code executable by the processing device. In some embodiments, a persistent copy of the computer readable instructions 604 may be placed into a persistent storage device in the factory or in the field (through, for example, a machine-accessible distribution medium (not shown)). In some embodiments, a persistent copy of the computer readable instructions 604 may be placed into a persistent storage device through a suitable communication pathway (e.g., from a distribution server).

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

EXAMPLES

Examples, according to various embodiments, may include the following.

Example 1 may be a resource manager, comprising: one or more processors; a resource manager module (RMM) communicatively coupled to the one or more processors, wherein the RMM is to: receive an indication of a node resource of a plurality of node resources and an indication of an accelerator resource of a plurality of accelerator resources to connect to the node resource; if the indicated accelerator resource is connected to another node resource of the plurality of node resources, then transmit, to an interconnect switch, one or more hot-remove commands; and transmit, to the interconnect switch, one or more hot-add commands.

Example 2 may include the resource manager of example 1, wherein the RMM is to track connections respectively of the plurality of accelerator resources to the plurality of node resources and to cause the interconnect switch to connect the indicated accelerator resource of the plurality of accelerator resources to the indicated node resource of the plurality of node resources.

Example 3 may include the resource manager of example 1, wherein the one or more hot-remove commands are to cause the interconnect switch to hot-remove the indicated accelerator resource from the another node resource.

Example 4 may include the resource manager of example 3, wherein to hot-remove the indicated accelerator resource from the another node resource further includes to cause data traffic on a connection between the indicated accelerator resource and the another node resource to become quiescent.

Example 5 may include the resource manager of example 3, wherein to hot-remove the indicated accelerator resource from the another node resource further includes to sever the connection between the indicated accelerator resource and the another node resource.

Example 6 may include the resource manager of example 1, wherein the one or more hot-add commands are to cause the interconnect switch to hot-add the indicated accelerator resource to the indicated node resource.

Example 7 may include the resource manager of any one of examples 1-6, wherein to hot-add the indicated accelerator resource to the indicated node resource further includes to: establish, via the interconnect switch, a connection between the indicated accelerator resource and the indicated node resource; configure, via the interconnect switch, the indicated accelerator resource to communicate with the indicated node resource over the established connection; and configure, via the interconnect switch, the indicated node resource to communicate with the indicated accelerator resource over the established connection.

Example 8 may include the resource manager of example 7, wherein a time duration between receipt by the interconnect switch of the one or more commands to hot-add the indicated accelerator resource to the indicated node resource and an active established connection between the indicated accelerator resource and the indicated node resource is less than 10 nanoseconds (ns).

Example 9 may include the resource manager of example 8, wherein an active established connection between the indicated accelerator resource and the indicated node resource includes data flow between the indicated accelerator resource and the indicated node resource.

Example 10 may include the resource manager of any one of examples 1-6, wherein the interconnect switch is a low-latency bypass path that includes a first and a second plurality of ports, each of the first set of ports includes a multiplexer with a direct connection to each of the second plurality of ports, and wherein the interconnect switch receives commands from the RMM to hot-add or hot-remove connections between one of the first set of plurality of ports and one of the second set of the plurality of ports.

Example 11 may include the resource manager of example 10, wherein one or more of the first set of ports are connected respectively to one or more of the plurality of accelerator resources and one or more of the second set of ports are connected respectively to one or more of the plurality of node resources.

Example 12 may include the resource manager of any one of examples 1-6, wherein the plurality of accelerator resources includes a Field Programmable Gate Array (FPGA), a Graphical Processor Unit (GPU), or an Application Specific Integrated Circuit (ASIC).

Example 13 may include the resource manager of any one of examples 1-6, wherein the plurality of node resources includes a Central Processing Unit (CPU) or a System on a Chip (SOC).

Example 14 may include the resource manager of any one of examples 1-6, wherein the indicated node resource is a plurality of CPUs coupled using coherency links.

Example 15 may include the resource manager of any one of examples 1-6, wherein the indicated accelerator resource is a cache for the indicated node resource.

Example 16 may include the resource manager of example 1, wherein some of the plurality of node resources are in different coherency domains.

Example 17 may include the resource manager of any one of examples 1-6, wherein some of the plurality of accelerator resources are associated with different coherency domains.

Example 18 may include the resource manager of example 1, wherein the indicated node resource includes a Peripheral Component Interconnect Express (PCIe) port or an Intel Accelerator Link (IAL) port.

Example 19 may include the resource manager of example 1, wherein the resource manager is located within the interconnect switch.

Example 20 may include the resource manager of example 1, wherein the interconnect switch is a plurality of interconnect switches.

Example 21 may include the resource manager of any one of examples 1-20, wherein the indicated node resource and the indicated accelerator resource are in different racks.

Example 22 may include the resource manager of any one of examples 1-20, wherein the indicated node resource and the indicated accelerator resource are in different pods.

Example 23 may be a method to manage resources, comprising: receiving an indication of a node resource of a plurality of node resources and an indication of an accelerator resource of a plurality of accelerator resources to connect to the node resource; if the indicated accelerator resource is connected to another node resource of the plurality of node resources, then transmitting, to an interconnect switch, one or more hot-remove commands; and transmitting, to the interconnect switch, one or more hot-add commands.

Example 24 may include the method of example 23, further comprising tracking connections respectively of the plurality of accelerator resources to the plurality of node resources.

Example 25 may include the method of example 23, further comprising causing the interconnect switch to connect the indicated accelerator resource of the plurality of accelerator resources to the indicated node resource of the plurality of node resources.

Example 26 may include the method of example 23, wherein the one or more hot-remove commands are to cause the interconnect switch to hot-remove the indicated accelerator resource from the another node resource.

Example 27 may include the method of example 26, wherein to hot-remove the indicated accelerator resource from the another node resource further includes to cause data traffic on a connection between the indicated accelerator resource and the another node resource to become quiescent.

Example 28 may include the method of example 26, wherein to hot-remove the indicated accelerator resource from the another node resource further includes to sever the connection between the indicated accelerator resource and the another node resource.

Example 29 may include the method of example 23, wherein the one or more hot-add commands are to cause the interconnect switch to hot-add the indicated accelerator resource to the indicated node resource.

Example 30 may include the method of example 29, wherein to hot-add the indicated accelerator resource to the indicated node resource further includes: establishing, by the interconnect switch, a connection between the indicated accelerator resource and the indicated node resource; configuring, by the interconnect switch, the indicated accelerator resource to communicate with the indicated node resource over the established connection; and configuring, by the interconnect switch, the indicated node resource to communicate with the indicated accelerator resource over the established connection.

Example 31 may include the method of example 30, wherein a time duration between receipt by the interconnect switch of the one or more commands to hot-add the indicated accelerator resource to the indicated node resource and an active established connection between the indicated accelerator resource and the indicated node resource is less than 10 nanoseconds (ns).

Example 32 may include the method of example 31, wherein an active established connection between the indicated accelerator resource and the indicated node resource includes data flow between the indicated accelerator resource and the indicated node resource.

Example 33 may include the method of example 23, wherein the interconnect switch is a low-latency bypass path that includes a first and a second plurality of ports, each of the first set of ports includes a multiplexer with a direct connection to each of the second plurality of ports; and further comprising receiving, by the interconnect switch, commands to hot-add or hot-remove connections between one of the first set of plurality of ports and one of the second set of the plurality of ports.

Example 34 may include the method of example 33, wherein one or more of the first set of ports are connected respectively to one or more of the plurality of accelerator resources and one or more of the second set of ports are connected respectively to one or more of the plurality of node resources.

Example 35 may include the method of example 23, wherein the plurality of accelerator resources includes a Field Programmable Gate Array (FPGA), a Graphical Processor Unit (GPU), or an Application Specific Integrated Circuit (ASIC).

Example 36 may include the method of example 23, wherein the plurality of node resources includes a Central Processing Unit (CPU) or a System on a Chip (SOC).

Example 37 may include the method of example 23, wherein the indicated node resource is a plurality of CPUs coupled using coherency links.

Example 38 may include the method of example 23, wherein the indicated accelerator resource is a cache for the indicated node resource.

Example 39 may include the method of example 23, wherein some of the plurality of node resources are in different coherency domains.

Example 40 may include the method of example 23, wherein some of the plurality of accelerator resources are associated with different coherency domains.

Example 41 may include the method of example 23, wherein the indicated node resource includes a Peripheral Component Interconnect Express (PCIe) port or an Intel Accelerator Link (IAL) port.

Example 42 may include the method of example 23, wherein the method is performed within the interconnect switch.

Example 43 may include the method of example 23, wherein the interconnect switch is a plurality of interconnect switches.

Example 44 may include the method of any one of examples 23-43, wherein the indicated node resource and the indicated accelerator resource are in different racks.

Example 45 may include the method of any one of examples 23-43, wherein the indicated node resource and the indicated accelerator resource are in different pods.

Example 46 may be a resource manager apparatus, comprising: means for receiving an indication of a node resource of a plurality of node resources and an indication of an accelerator resource of a plurality of accelerator resources to connect to the node resource; if the indicated accelerator resource is connected to another node resource of the plurality of node resources, then means for transmitting, to an interconnect switch, one or more hot-remove commands; and means for transmitting, to the interconnect switch, one or more hot-add commands.

Example 47 may include the apparatus of example 46, further comprising means for tracking connections respectively of the plurality of accelerator resources to the plurality of node resources.

Example 48 may include the apparatus of example 46, further comprising means for causing the interconnect switch to connect the indicated accelerator resource of the plurality of accelerator resources to the indicated node resource of the plurality of node resources.

Example 49 may include the apparatus of example 46, wherein the one or more hot-remove commands are to cause the interconnect switch to hot-remove the indicated accelerator resource from the another node resource.

Example 50 may include the apparatus of example 49, wherein to hot-remove the indicated accelerator resource from the another node resource further includes to cause data traffic on a connection between the indicated accelerator resource and the another node resource to become quiescent.

Example 51 may include the apparatus of example 49, wherein to hot-remove the indicated accelerator resource from the another node resource further includes to sever the connection between the indicated accelerator resource and the another node resource.

Example 52 may include the apparatus of example 46, wherein the one or more hot-add commands are to cause the interconnect switch to hot-add the indicated accelerator resource to the indicated node resource.

Example 53 may include the apparatus of example 52, wherein to hot-add the indicated accelerator resource to the indicated node resource further includes: establishing, by the interconnect switch, a connection between the indicated accelerator resource and the indicated node resource; configuring, by the interconnect switch, the indicated accelerator resource to communicate with the indicated node resource over the established connection; and configuring, by the interconnect switch, the indicated node resource to communicate with the indicated accelerator resource over the established connection.

Example 54 may include the apparatus of example 53, wherein a time duration between receipt by the interconnect switch of the one or more commands to hot-add the indicated accelerator resource to the indicated node resource and an active established connection between the indicated accelerator resource and the indicated node resource is less than 10 nanoseconds (ns).

Example 55 may include the apparatus of example 54, wherein an active established connection between the indicated accelerator resource and the indicated node resource includes data flow between the indicated accelerator resource and the indicated node resource.

Example 56 may include the apparatus of example 46, wherein the interconnect switch is a low-latency bypass path that includes a first and a second plurality of ports, each of the first set of ports includes a multiplexer with a direct connection to each of the second plurality of ports; and further comprising means for receiving, by the interconnect switch, commands to hot-add or hot-remove connections between one of the first set of plurality of ports and one of the second set of the plurality of ports.

Example 57 may include the apparatus of example 56, wherein one or more of the first set of ports are connected respectively to one or more of the plurality of accelerator resources and one or more of the second set of ports are connected respectively to one or more of the plurality of node resources.

Example 58 may include the apparatus of example 46, wherein the plurality of accelerator resources includes a Field Programmable Gate Array (FPGA), a Graphical Processor Unit (GPU), or an Application Specific Integrated Circuit (ASIC).

Example 59 may include the apparatus of example 46, wherein the plurality of node resources includes a Central Processing Unit (CPU) or a System on a Chip (SOC).

Example 60 may include the apparatus of example 46, wherein the indicated node resource is a plurality of CPUs coupled using coherency links.

Example 61 may include the apparatus of example 46, wherein the indicated accelerator resource is a cache for the indicated node resource.

Example 62 may include the apparatus of example 46, wherein some of the plurality of node resources are in different coherency domains.

Example 63 may include the apparatus of example 46, wherein some of the plurality of accelerator resources are associated with different coherency domains.

Example 64 may include the apparatus of example 46, wherein the indicated node resource includes a Peripheral Component Interconnect Express (PCIe) port or an Intel Accelerator Link (IAL) port.

Example 65 may include the apparatus of example 46, wherein the method is performed within the interconnect switch.

Example 66 may include the apparatus of example 46, wherein the interconnect switch is a plurality of interconnect switches.

Example 67 may include the apparatus of any one of examples 46-66, wherein the indicated node resource and the indicated accelerator resource are in different racks.

Example 68 may include the apparatus of any one of examples 46-66, wherein the indicated node resource and the indicated accelerator resource are in different pods.

Example 69 may be a system comprising: one or more processors; a resource manager module (RMM) communicatively coupled to the one or more processors, wherein the RMM is to: receive an indication of a node resource of a plurality of node resources and an indication of an accelerator resource of a plurality of accelerator resources to connect to the node resource; if the indicated accelerator resource is connected to another node resource of the plurality of node resources, then transmit, to an interconnect switch, one or more hot-remove commands; and transmit, to the interconnect switch, one or more hot-add commands; and the interconnect switch communicatively coupled to the RMM to provide a low-latency bypass path between the plurality of node resources and the plurality of accelerator resources comprising a first and a second plurality of ports, each of the first set of ports includes a multiplexer with a direct connection to each of the second plurality of ports; and wherein the interconnect switch is to receive one or more hot-remove commands to disconnect another node resource from the indicated accelerator resource or hot-add commands to connect the indicated node resource to the indicated accelerator resource.

Example 70 may include the system of example 69, wherein the RMM is to communicate directly with the plurality of multiplexers.

Example 71 may include the system of any one of examples 69-70, wherein one or more of the first set of ports are connected respectively to one or more of the plurality of accelerator resources and one or more of the second set of ports are connected respectively to one or more of the plurality of node resources.

Example 72 may include the system of example 69, wherein the plurality of accelerator resources includes a Field Programmable Gate Array (FPGA), a Graphical Processor Unit (GPU), or an Application Specific Integrated Circuit (ASIC).

Example 73 may include the system of example 69, wherein the plurality of node resources includes a Central Processing Unit (CPU) or a System on a Chip (SOC).

Example 74 may include the system of example 69, wherein the indicated node resource is a plurality of CPUs coupled using coherency links.

Example 75 may include the system of example 69, wherein the indicated accelerator resource is a cache for the indicated node resource.

Example 76 may include the system of example 69, wherein some of the plurality of node resources are in different coherency domains.

Example 77 may include the system of example 69, wherein some of the plurality of accelerator resources are associated with different coherency domains.

Example 78 may include the system of example 69, wherein the indicated node resource includes a Peripheral Component Interconnect Express (PCIe) port or an Intel Accelerator Link (IAL) port.

Example 79 may include the system of example 69, wherein the RMM module is located within the interconnect switch.

Example 80 may include the system of example 69, wherein the interconnect switch is a plurality of interconnect switches.

Example 81 may include the system of any one of examples 69-80, wherein the indicated node resource and the indicated accelerator resource are in different racks.

Example 82 may include the system of any one of examples 69-80, wherein the indicated node resource and the indicated accelerator resource are in different pods.

What is claimed is:

1. A resource manager, comprising:
one or more processors;
a resource manager module (RMM) communicatively coupled to the one or more processors, wherein the RMM is to:
receive an indication of a node resource of a plurality of node resources and an indication of an accelerator resource of a plurality of accelerator resources to connect to the node resource, wherein at least two of the plurality of accelerator resources are in a same coherency domain;
if the indicated accelerator resource is connected to another node resource of the plurality of node resources, then transmit, to an interconnect switch, one or more hot-remove commands; and
transmit, to the interconnect switch, one or more hot-add commands; and
wherein:
the one or more hot-add commands are to cause the interconnect switch to hot-add the indicated accelerator resource to the indicated node resource; and
to hot-add the indicated accelerator resource to the indicated node resource further includes to:
establish, via the interconnect switch, a connection between the indicated accelerator resource and the indicated node resource:
configure, via the interconnect switch, the indicated accelerator resource to communicate with the indicated node resource over the established connection; and
configure, via the interconnect switch, the indicated node resource to communicate with the indicated accelerator resource over the established connection.

2. The resource manager of claim 1, wherein the RMM is to track connections respectively of the plurality of accelerator resources to the plurality of node resources and to cause the interconnect switch to connect the indicated accelerator resource of the plurality of accelerator resources to the indicated node resource of the plurality of node resources.

3. The resource manager of claim 1, wherein the one or more hot-remove commands are to cause the interconnect switch to hot-remove the indicated accelerator resource from the another node resource.

4. The resource manager of claim 3, wherein to hot-remove the indicated accelerator resource from the another node resource further includes to cause data traffic on a connection between the indicated accelerator resource and the another node resource to become quiescent.

5. The resource manager of claim 3, wherein to hot-remove the indicated accelerator resource from the another node resource further includes to sever the connection between the indicated accelerator resource and the another node resource.

6. The resource manager of claim 1, wherein a time duration between receipt by the interconnect switch of the one or more commands to hot-add the indicated accelerator resource to the indicated node resource and an active established connection between the indicated accelerator resource and the indicated node resource is less than 10 nanoseconds (ns).

7. The resource manager of claim 6, wherein an active established connection between the indicated accelerator resource and the indicated node resource includes data flow between the indicated accelerator resource and the indicated node resource.

8. The resource manager of claim 1, wherein the interconnect switch is a low-latency bypass path that includes a first and a second plurality of ports, each of the first set of ports includes a multiplexer with a direct connection to each of the second plurality of ports, and wherein the interconnect switch receives commands from the RMM to hot-add or hot-remove connections between one of the first set of plurality of ports and one of the second set of the plurality of ports.

9. The resource manager of claim 8, wherein one or more of the first set of ports are connected respectively to one or more of the plurality of accelerator resources and one or more of the second set of ports are connected respectively to one or more of the plurality of node resources.

10. The resource manager of claim 1, wherein the plurality of accelerator resources includes a Field Programmable Gate Array (FPGA), a Graphical Processor Unit (GPU), or an Application Specific Integrated Circuit (ASIC).

11. The resource manager of claim 1, wherein the plurality of node resources includes a Central Processing Unit (CPU) or a System on a Chip (SOC).

12. The resource manager of claim 1, wherein the indicated node resource is a plurality of CPUs coupled using coherency links.

13. The resource manager of claim 1, wherein the indicated accelerator resource is a cache for the indicated node resource.

14. The resource manager of claim 1, wherein some of the plurality of node resources are in different coherency domains.

15. The resource manager of claim 1, wherein some of the plurality of accelerator resources are associated with different coherency domains.

16. A method to manage resources, comprising:
receiving an indication of a node resource of a plurality of node resources and an indication of an accelerator resource of a plurality of accelerator resources to connect to the node resource, wherein at least two of the plurality of accelerator resources are in a same coherency domain;
if the indicated accelerator resource is connected to another node resource of the plurality of node resources, then transmitting, to an interconnect switch, one or more hot-remove commands; and
transmitting, to the interconnect switch, one or more hot-add commands; and
wherein:
the one or more hot-add commands are to cause the interconnect switch to hot-add the indicated accelerator resource to the indicated node resource; and
to hot-add the indicated accelerator resource to the indicated node resource further includes to:
establish, via the interconnect switch, a connection between the indicated accelerator resource and the indicated node resource;
configure, via the interconnect switch, the indicated accelerator resource to communicate with the indicated node resource over the established connection; and
configure, via the interconnect switch, the indicated node resource to communicate with the indicated accelerator resource over the established connection.

17. The method of claim 16, further comprising tracking connections respectively of the plurality of accelerator resources to the plurality of node resources.

18. The method of claim 16, wherein the method is performed within the interconnect switch.

19. The method of claim 16, wherein the interconnect switch is a plurality of interconnect switches.

20. The method of claim 16, wherein the indicated node resource and the indicated accelerator resource are in different racks or are in different pods.

21. A system comprising:
one or more processors;
a resource manager module (RMM) communicatively coupled to the one or more processors, wherein the RMM is to:
receive an indication of a node resource of a plurality of node resources and an indication of an accelerator resource of a plurality of accelerator resources to connect to the node resource;
if the indicated accelerator resource is connected to another node resource of the plurality of node resources, then transmit, to an interconnect switch, one or more hot-remove commands; and
transmit, to the interconnect switch, one or more hot-add commands; and
the interconnect switch communicatively coupled to the RMM to provide a low-latency bypass path between the plurality of node resources and the plurality of accelerator resources comprising a first and a second plurality of ports, each of the first set of ports includes a multiplexer with a direct connection to each of the second plurality of ports; and
wherein the interconnect switch is to receive one or more hot-remove commands to disconnect another node resource from the indicated accelerator resource or one or more hot-add commands to connect the indicated node resource to the indicated accelerator resource, wherein at least two of the plurality of accelerator resources are in a same coherency domain; and
wherein:
the one or more hot-add commands are to cause the interconnect switch to hot-add the indicated accelerator resource to the indicated node resource; and
to hot-add the indicated accelerator resource to the indicated node resource further includes to:
establish, via the interconnect switch, a connection between the indicated accelerator resource and the indicated node resource:
configure, via the interconnect switch, the indicated accelerator resource to communicate with the indicated node resource over the established connection; and
configure, via the interconnect switch, the indicated node resource to communicate with the indicated accelerator resource over the established connection.

22. The system of claim 21, wherein the RMM is to communicate directly with the plurality of multiplexers.

23. The system of claim 21, wherein one or more of the first set of ports are connected respectively to one or more of the plurality of accelerator resources and one or more of the second set of ports are connected respectively to one or more of the plurality of node resources.

* * * * *